(12) United States Patent
Rottinghaus

(10) Patent No.: US 8,416,761 B2
(45) Date of Patent: Apr. 9, 2013

(54) MITIGATING SYNCHRONIZATION LOSS

(75) Inventor: Alan P. Rottinghaus, Barrington, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1058 days.

(21) Appl. No.: 11/536,224

(22) Filed: Sep. 28, 2006

(65) Prior Publication Data

US 2008/0080448 A1    Apr. 3, 2008

(51) Int. Cl.
*H04J 3/06* (2006.01)

(52) U.S. Cl.
USPC .......... 370/350; 370/304; 370/324; 370/503; 455/502; 455/208; 455/209; 455/258

(58) Field of Classification Search .................. 370/241, 370/298, 304, 324, 350, 395.62, 503, 507; 455/51.5, 265, 502
See application file for complete search history.

(56) References Cited

U.S. PATENT DOCUMENTS

| | | | |
|---|---|---|---|
| 3,983,498 A | 9/1976 | Malek | |
| 5,666,366 A | 9/1997 | Malek et al. | |
| 5,991,289 A * | 11/1999 | Huang et al. | 370/350 |
| 6,094,421 A | 7/2000 | Scott | |
| 6,388,997 B1 | 5/2002 | Scott | |
| 6,628,642 B1 * | 9/2003 | Mile'n et al. | 370/350 |
| 2002/0054585 A1 * | 5/2002 | Hanada et al. | 370/342 |
| 2002/0141435 A1 * | 10/2002 | Newberg et al. | 370/442 |
| 2002/0181509 A1 * | 12/2002 | Mody et al. | 370/480 |
| 2004/0001447 A1 * | 1/2004 | Schafer | 370/280 |
| 2005/0073971 A1 * | 4/2005 | Mukai | 370/328 |
| 2006/0176848 A1 * | 8/2006 | Kimura | 370/328 |
| 2007/0097887 A1 * | 5/2007 | Kim et al. | 370/276 |

FOREIGN PATENT DOCUMENTS

WO    02086687 A1    10/2002

* cited by examiner

*Primary Examiner* — Kamran Afshar
*Assistant Examiner* — Khalid Shaheed

(57) ABSTRACT

Disclosed are a wireless communication system, method, and site controller for mitigating at least one of a transmission timing synchronization loss and a receiving timing synchronization loss at a base station. The method includes determining, at a first base station, a loss of a timing reference the timing reference is used by the first base station for timing synchronization of at least one of a transmission and reception of wireless data. The timing synchronization is predefined and common between at least the first base station and a second base station. The method further includes adjusting, in response to the determining, at least one of a transmit guard time and a receive guard time by at least one symbol time.

20 Claims, 6 Drawing Sheets

MITIGATING SYNCHRONIZATION LOSS

FIELD OF THE INVENTION

The present invention generally relates to the field of wireless communications, and more particularly relates to mitigating transmission/receiving synchronization loss in wireless communication systems.

BACKGROUND OF THE INVENTION

Wireless communication systems have evolved greatly over the past few years. Current wireless communication systems are capable of transmitting and receiving broadband content such as streaming video and audio. One communication scheme used in today's wireless communication systems is time division duplex ("TDD"). TDD allows for the transmission and reception of data on a single frequency. In a TDD system, communication devices such as base stations and wireless communication devices need to be synchronized with each other. For example, because the same frequency is used for transmitting and receiving data, if a wireless communication device is transmitting while a neighboring device is trying to receive there is potential for interference between the two devices.

If one of the base stations in the TDD system loses TX/RX synchronization a stability oscillator at the base station tries to keep the base station in sync with the rest of the system. However, stability oscillators usually only allow a free-run time of hours. In other words, stability oscillators have a maximum drift rate usually measurable by hours before the base station will cause serious problems for the system. If the base station cannot be repaired within the maximum drift rate time, the base station needs to be shut down. In some instances, a repair crew might not be able to reach the base station until well after the maximum drift time of the stability oscillator.

Therefore a need exists to overcome the problems with the prior art as discussed above.

SUMMARY OF THE INVENTION

Briefly, in accordance with the present invention, disclosed are a wireless communication system, method, and site controller for mitigating at least one of a transmission timing synchronization loss and a receiving timing synchronization loss at a base station. The method includes determining, at a first base station, a loss of a timing reference the timing reference is used by the first base station for timing synchronization of at least one of a transmission and reception of wireless data. The timing synchronization is predefined and common between at least the first base station and a second base station. The method further includes adjusting, in response to the determining, at least one of a transmit guard time and a receive guard time by at least one symbol time.

In another embodiment, a wireless communication system for mitigating at least one of a transmission timing synchronization loss and a receiving timing synchronization loss at a base station is disclosed. The wireless communication system comprises a plurality of wireless devices and a plurality of base stations that are communicatively coupled to the plurality of wireless devices. The wireless communication system also includes at least one information processing system that is communicatively coupled to the plurality of base stations.

The information processing system includes a synchronization monitor for determining a loss of a timing reference for at least a first base station. The timing reference is used by the first base station for timing synchronization of at least one of a transmission and reception of wireless data. The timing synchronization is predefined and common between at least the first base station and a second base station. The information processing system also includes a guard time updater for adjusting, in response to the determining, at least one of a transmit guard time and a receive guard time associated with the at least first base station by at least one symbol time.

In yet another embodiment, a site controller for mitigating at least one of a transmission timing synchronization loss and a receiving timing synchronization loss the at least one base station. The site controller includes a synchronization monitor for determining a loss of a timing reference at least a first base station. The timing reference is used by the first base station for timing synchronization of at least one of a transmission and reception of wireless data. The timing synchronization is predefined and common between at least the first base station and a second base station. The information processing system also includes a guard time updater for adjusting, in response to the determining, at least one of a transmit guard time and a receive guard time associated with the at least first base station by at least one symbol time.

An advantage of the foregoing embodiments of the present invention is that the survivability of a base station after it has lost a timing reference for TX/RX of data is extended. Instead of only being able to transmit and receive for hours before the base station needs to be shut down, embodiments of the present invention allow a base station and its wireless devices to transmit and receive data for days even though its timing reference has been lost.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of embodiments of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term wireless communication device is intended to broadly cover many different types of devices that can wirelessly receive signals, and optionally can wirelessly transmit signals, and may also operate in a wireless communication system. For example, and not for any limitation, a wireless communication device can include any one or a combination of the following: a cellular telephone, a mobile phone, a smartphone, a two-way radio, a two-way pager, a wireless messaging device, a laptop/computer, automotive gateway, residential gateway, and the like.

Wireless Communications System

Figure 1:
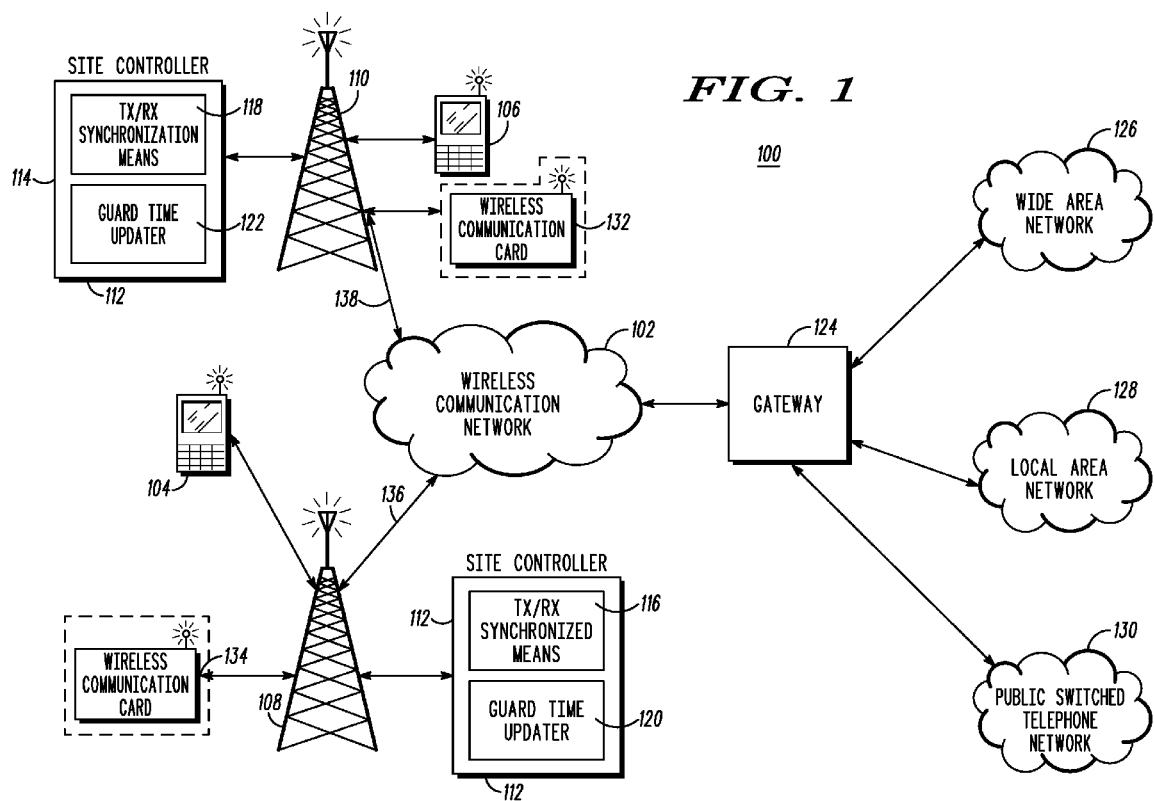
FIG. 1 is block diagram illustrating a wireless communications system, according to an embodiment of the present invention.

According to an embodiment of the present invention, as shown in FIG. 1, a wireless communications system 100 is illustrated. FIG. 1 shows a wireless communications network 102 that connects wireless communication devices 104, 106, 132, 134 to other wireless communication devices and/or to other networks such as a wide area network 126, a local area network 128, a public switched telephone network 130, and the like via a gateway 124. The wireless communications network 102 comprises a mobile phone network, a mobile text messaging device network, a pager network, or the like.

Further, the communications standard of the wireless communications network 102 of FIG. 1 comprises Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), or the like. Additionally, the wireless communications network 102 also comprises text messaging standards, for example, Short Message Service (SMS), Enhanced Messaging Service (EMS), Multimedia Messaging Service (MMS), or the like. The wireless communications network 102 also allows for push-to-talk over cellular communications between capable wireless communication devices.

The wireless communications network 102 supports any number of wireless communication devices 104, 106, 132, 134. The support of the wireless communications network 102 includes support for mobile telephones, smart phones, text messaging devices, handheld computers, pagers, beepers, wireless communication cards, or the like. A smart phone is a combination of 1) a pocket PC, handheld PC, palm top PC, or Personal Digital Assistant (PDA), and 2) a mobile telephone. More generally, a smartphone may be a mobile telephone that has additional application processing capabilities. The wireless communication cards 132, 134, in one embodiment, reside within an information processing system as shown by the dashed lines. The information processing system, in one embodiment, may be a personal computer, a personal, digital assistant, a smart phone, and the like.

In one embodiment, the wireless communications network 102 is capable of broadband wireless communications utilizing time division duplexing ("TDD") as set forth, for example, by the IEEE 802.16e standard. The duplexing scheme TDD allows for the transmissions of signals in a downstream and upstream direction using a single frequency. It should be noted that the present invention is not limited to an 802.16e system for implementing TDD. Other communication systems that this invention may be applied to include UMTS LTE, 802.20 systems, and the like. Furthermore, the wireless communications system 100 is not limited to a system using only a TDD scheme. For example, TDD may be only used for a portion of the available communication channels in the system 100, while one or more schemes are used for the remaining communication channels.

The wireless communications system 100 also includes a group of base stations 108, 110 that are, for example, synchronized to a common synchronization scheme. The base stations 108, 110, in one embodiment, are connected to the wireless communication network 102 via an Ethernet connection 136, 138. However, it should be noted that other communication standards may be used. The synchronization, in one embodiment, is a time-based synchronization for transmitting and/or receiving wireless data. For example, in a wireless communications system using TDD (e.g. where transmitting and receiving is performed on the same frequency) synchronization between the base stations is necessary so that their respective wireless communication devices 104, 106, 132, 134 are not transmitting while the other wireless devices in the group are receiving and vice-versa. If this situation occurs, interference between the wireless devices 104, 106 may be created. Each base station 108, 110, in one embodiment, includes a site controller 112, 114.

Each base station 108, 110 (including the site controller 112, 114 that is coupled to the base station 108, 110) includes, in one embodiment, a synchronization means 116, 118 such as GPS for synchronizing the base station 108, 110 with the other base stations 108, 110 in the TDD system. The base station 108, 110 or site controller 112, 114 also includes a guard time updater 120, 122 for mitigating interference if the base station 108, 110 becomes unsynchronized with the rest of the TDD system. The guard time updater 120, 122 is discussed in greater detail below. It should be noted that the timing synchronization is not limited to using GPS. Other synchronization means, such as backhaul information, is also applicable to embodiments of the present invention. The synchronization of the base stations 108, 110 is discussed in greater detail below. The site controller 112, 114 is also discussed in greater detail below.

The wireless communication devices 104, 106, 132, 134 in one embodiment, are capable of wirelessly communicating data using the 802.16e standard or any other communication scheme that supports TDD. In another embodiment, the wireless communication devices 104, 106, 132, 134 are capable of wireless communications using other access schemes in addition to TDD. As the wireless communication devices 104, 106, 132, 134 enter a wireless communications cell they are synchronized with a respective base station 108, 110 in that cell. For example, as the wireless communication devices 104, 106, 132, 134 enter a cell they listen for a downlink communication from the base station 108, 110.

The downlink communication, in one embodiment, includes a preamble and basic control information, which allows a wireless communication device to determine downlink timing (with an error related to propagation time) and understand other basic aspects of the wireless communication system 100 such as location of uplink ranging. Once the downlink communication is received, the wireless communication devices 104, 106, 132, 134 can access a TDD ranging channel. A base station 108, 110 via the site controller 112, 114 can determine a timing delay of a wireless device based on information received from the device on the ranging channel. The base station 108, 110 can then signal the device 104, 106, 132, 134 using a forward link to either advance or retard its timing so that the device 104, 106, 132, 134 is synchronized with other devices 104, 106, 132, 134 in the system 100.

The synchronization between the wireless communication devices 104, 106, 132, 134 is a timing synchronization for wirelessly transmitting and receiving data. Therefore, the wireless communication devices 104, 106, 132, 134 all transmit and receive data at substantially the same time. If the wireless communication devices 104, 106, 132, 134 are communicating with the base stations 108, 110 using a TDD communication channel and the wireless communication devices 104, 106, 132, 134 are not synchronized, interference is created between the devices. It should be noted that the wireless communication devices 104, 106, 132, 134 do not synchronize with each other. For example, each wireless communication device 104, 106, 132, 134 is synchronized to a synchronization timing signal received from its respective base station 108, 110. Therefore, because the base stations 108, 110 are each synchronized to a given synchronization timing, the wireless communication devices 104, 106, 132, 134 are indirectly synchronized with each other. The wireless communication devices 104, 106, 132, 134 are discussed in more detail below.

Information Processing System

Figure 2:
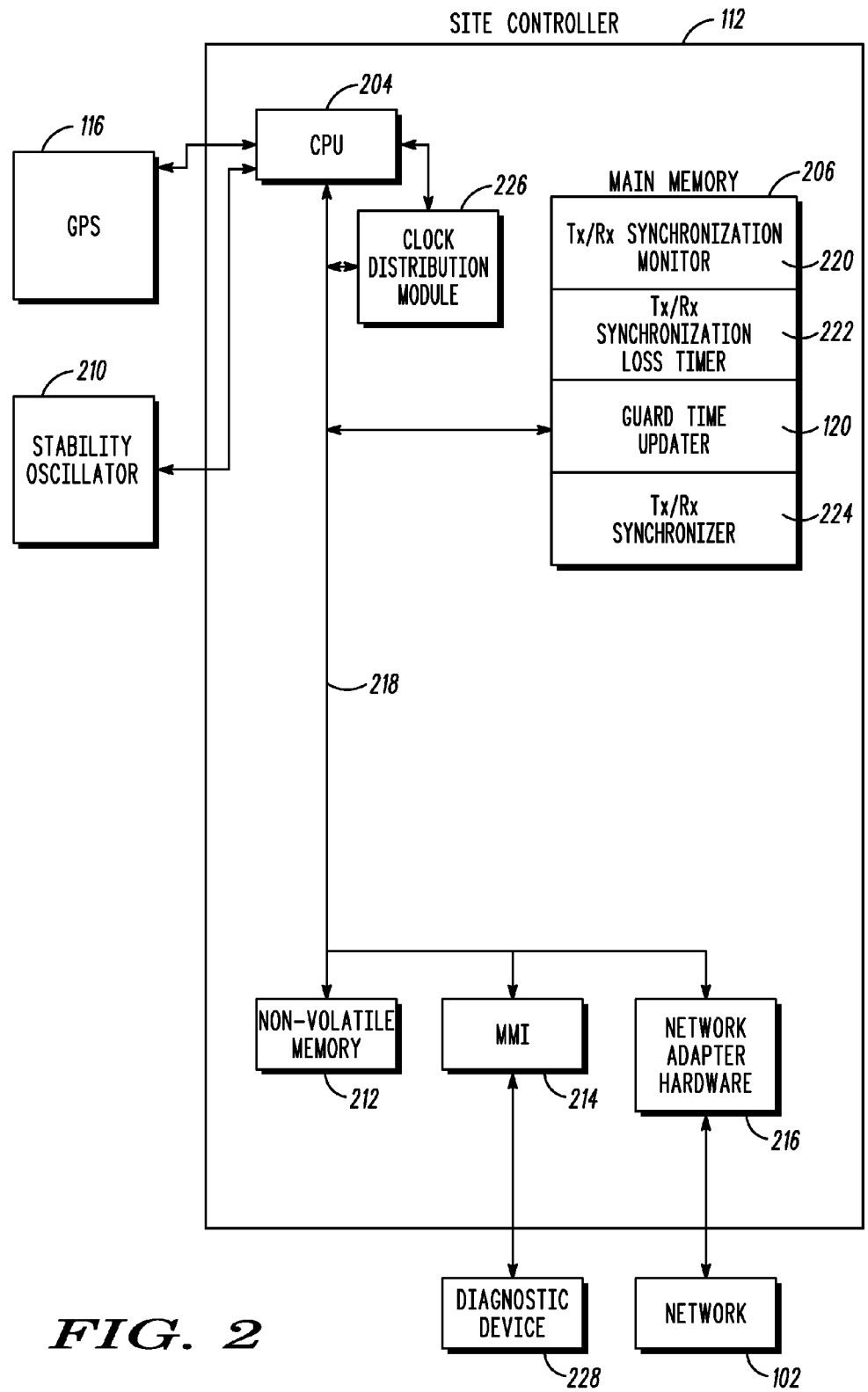
FIG. 2 is a block diagram illustrating a information processing system, according to an embodiment of the present invention.

FIG. 2 is a block diagram illustrating a more detailed view of the site controller 112 according to an embodiment of the present invention. The site controller 112, in one embodiment, resides within its respective base station 108. In another embodiment, the site controller 112 resides outside of and is communicatively coupled to its respective base station 108. The site controller 112 includes a processor 204 that is communicatively connected to a main memory 206 (e.g., volatile memory), the TX/RX timing synchronization means 116, a stability oscillator 210, non-volatile memory 212, a man-machine interface ("MMI") 214, a clock generator 226, and a network adapter hardware 216. A system bus 218 interconnects these system components. The main memory 206 includes a TX/RX synchronization monitor 220, a TX/RX synchronization loss timer 222, a guard time updater 120, and a TX/RX synchronizer 224. In one embodiment, these components are algorithms that may be executing in the CPU 204. Parameters for these components can reside in the main memory 206. In another embodiment, these components can be hardware components residing outside of the main memory 206. The MMI 214, in one embodiment, is used to directly connect one or more diagnostic devices 228 to the site controller 112.

The TX/RX timing synchronization means 116, in one embodiment, is a Global Positioning System ("GPS") module, which provides a master clock source for the site controller 112. For example, the CPU 204 receives the clock source from the GPS module 116 and passes this clock source to a clock distribution module 226. Clock signals for the respective components of the base station 108 are generated, in one embodiment, by the clock distribution module 226 based on the master clock source received from the GPS module 116.

The master clock source provides a timing reference for the base station 108 that is used to synchronize itself and its respective wireless communication devices for transmission and reception of wireless data. A TX/RX synchronizer 224 uses the timing reference to synchronize the base station 108 for wireless transmitting and receiving data. Each of the base stations 108, 110 in the wireless communication system 100 are synchronized to a substantially common synchronization timing. In other words, the TX/RX timing synchronization means 116 communicatively coupled to each base station 108, 110 generates a substantially common synchronization timing signal. Therefore, the transmission and reception of data by each base station 108, 110 is synchronized with the other base stations 108, 110 in the wireless communication system. For example, the base stations 108, 110 are synchronized so that downlink and uplink subframes in a TDD communication frame transmitted by each base station 108, 110 are aligned. In other words, the synchronization ensures that the wireless devices 104, 106 of one base station 108, 110 are not transmitting/receiving while the other wireless devices 104, 106 of the TDD system are receiving/transmitting.

In one embodiment, the TX/RX timing synchronization is predefined and common among all of the base stations 108, 110. In one embodiment, wireless communication devices that are coupled to the base station 108 are also synchronized for transmission and reception of data. For example, the preamble of a downlink frame includes synchronization information for synchronizing one or more respective wireless communication devices 104.

The stability oscillator 210, in one embodiment, is a medium stability oscillator, a high stability oscillator, or the like. The stability oscillator 210 acts as a back-up synchronization device if the TX/RX timing synchronization means 116 fails or if a timing reference signal is lost for any reason. For example, if the TX/RX timing synchronization means 116, the stability oscillator 210 provides a timing frame of reference to the clock distribution module 226. The stability oscillator 210 has a relatively slow drift rate, e.g., 0.8 μs per hour, which extends the survivability of the communications system 100. The synchronization of the base station 108 with respect to a timing frame of reference that is common to the base stations 108, 110, in one embodiment, is monitored by a TX/RX synchronization monitor 220.

The TX/RX synchronization monitor 220 detects when a loss of the timing reference has occurred. A timing reference loss may occur, for example, from a failure of the TX/RX timing synchronization means 116, loss of the GPS signal, and the like. Once a loss is detected, a TX/RX synchronization loss timer 222 starts to count a predefined time period. The TX/RX synchronization loss timer 222 is used to determine when a predefined period of time has passed since losing the time reference signal. In one embodiment, the predefined period of time correlates to a known amount of time that the stability oscillator may drift (e.g. maximum clock slip rate) before potential interference between wireless devices 104, 106 occurs.

The guard time updater 120 helps mitigate interference. For example, in an 802.16e system utilizing TDD, a frame comprises, among other things, a downlink portion, uplink portion, a transmit turn guard ("TTG") portion, and a receive turn guard ("RTG") portion. The transmit turn guard is a time period where the wireless communication device 104 is transitioning from a transmitting mode to a receiving mode. In other words, the wireless communication device stops transmitting so that it can receive data from the base station 108. The receive turn guard is a time period where the wireless communication device 104 is transitioning from a receiving mode to a transmitting mode.

Once the predefined time period corresponding to the maximum drift rate has passed, the guard time updater 120 decreases the available amount of transmission time for the base station 108 and its respective wireless devices 104 by increasing the guard times in the frame. For example, the guard time updater 120 increases the TTG by one symbol time in both directions, e.g. before and after the TTG. The RTG is also increased by one symbol time in both directions. Therefore, the downlink portion, which is the portion of the frame where the base station 108 is transmitting, is decreased by two symbol times. The uplink portion of the frame, which is where wireless devices 104 are transmitting, is also decreased by two symbol times. It should be noted that the TTG and RTG can be increased by more than one symbol time. It should also be noted that symbol times can be different and do not have to be fixed for all symbols.

When the timing reference is lost, uncertainty exists as to whether the base station 108 is transmitting/receiving at the same time, before, or after the other base stations 110 thereby potentially causing interference. The adjustment of the guard times allows for this uncertainty to be removed. Adjusting the guard times prevents one wireless device 104 from transmitting to its base station 108 while another wireless device 106 is listening to its base station 110 and vice versa, which can cause interference.

The network adapter hardware 216 is used to provide an interface to the network 102. For example, the network adapter 216, in one embodiment provides the Ethernet connections 136, 138 between the base station 108, 110 and the wireless communications network 102. An embodiment of the present invention may be adapted to work with any data communications connections including present day analog and/or digital techniques or via a future networking mechanism.

Wireless Communication Device

Figure 3:
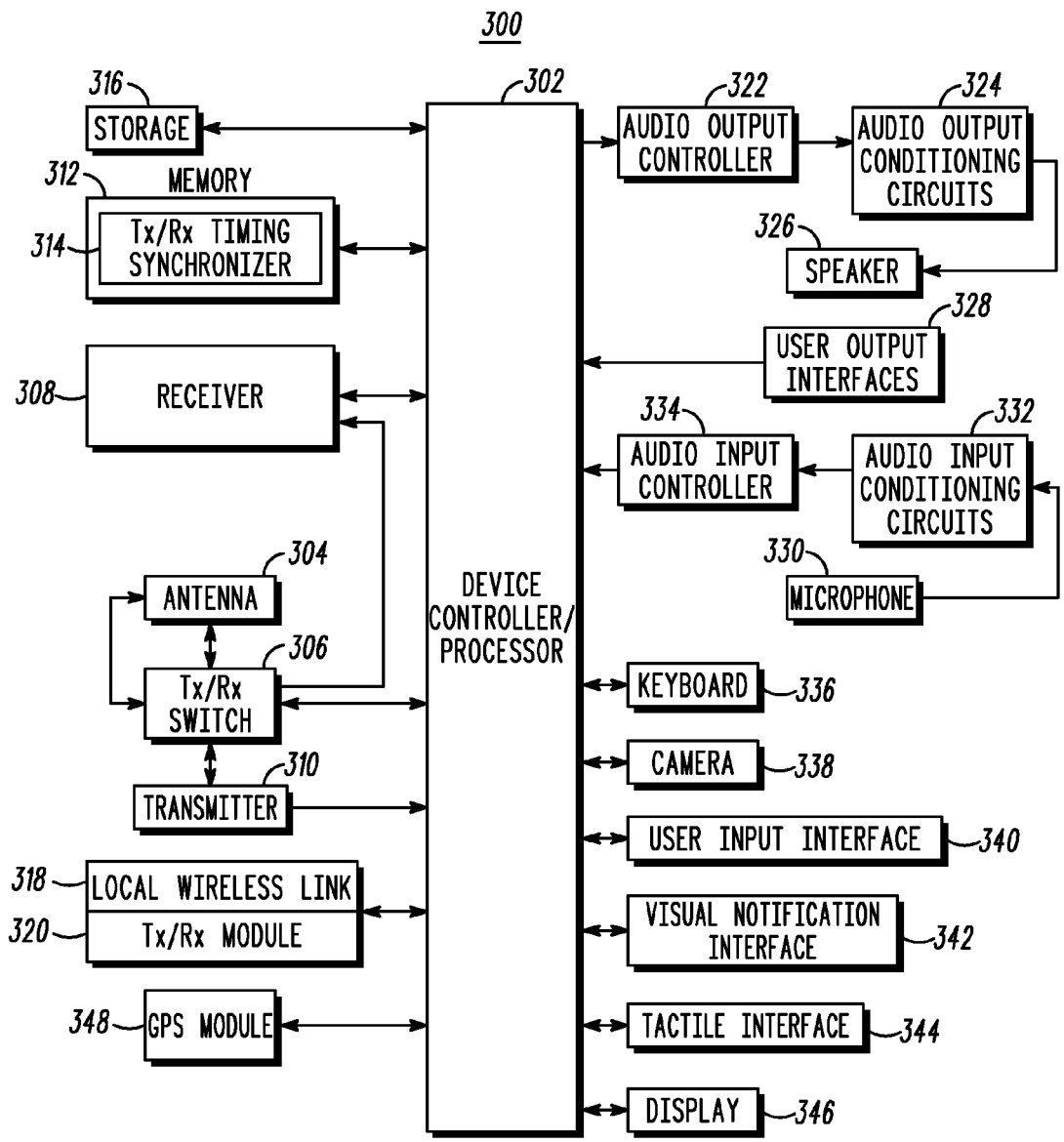
FIG. 3 is a block diagram illustrating a wireless communication device, according to an embodiment of the present invention.

FIG. 3 is a block diagram illustrating a more detailed view of the wireless communication device 104. It should be noted that other wireless communication devices such as wireless communication air interface cards 132, 134 are also compatible with embodiments of the present invention. FIG. 3 illustrates only one example of a wireless communication device type. In one embodiment, the wireless communication device 104 is capable of transmitting and receiving wireless information on the same frequency such as in an 802.16e system using TDD. The wireless communication device 104 operates under the control of a device controller/processor 302, that controls the sending and receiving of wireless communication signals. In receive mode, the device controller 302 electrically couples an antenna 304 through a transmit/receive switch 306 to a receiver 308. The receiver 308 decodes the received signals and provides those decoded signals to the device controller 302.

In transmit mode, the device controller 302 electrically couples the antenna 304, through the transmit/receive switch 306, to a transmitter 310. The device controller 302 operates the transmitter and receiver according to instructions stored in the memory 312. These instructions include, for example, a neighbor cell measurement-scheduling algorithm. The memory 312 also includes a TX/RX timing synchronizer 314. The TX/RX timing synchronizer 314 synchronizes the wireless communication device 104 with its respective base station 108 for transmitting and receiving wireless information.

For example, as the wireless communication device 104 enters into a cell it communicates with the base station 108 via a ranging channel.

The site controller 112 determines, in one embodiment, a timing scheme needed to synchronize the wireless device with the other wireless devices and base stations in the system 100. The wireless communication device 104 receives a timing synchronization message via the receiver 308 transmitted from the base station 108 on a reverse link. The timing synchronization message instructs the TX/RX timing synchronizer 314 to advance or retard a timing reference of the wireless device 104 thereby synchronizing the wireless device 104 with the other devices in the system 100.

The wireless communication device 104 also includes non-volatile storage memory 316 for storing, for example, an application waiting to be executed (not shown) on the wireless communication device 104. The wireless communication device 104, in this example, also includes an optional local wireless link 318 that allows the wireless communication device 104 to directly communicate with another wireless device without using a wireless network (not shown). The optional local wireless link 318, for example, is provided by Bluetooth, Infrared Data Access (IrDA) technologies, or the like. The optional local wireless link 318 also includes a local wireless link transmit/receive module 320 that allows the wireless device 104 to directly communicate with another wireless communication device such as wireless communication devices communicatively coupled to personal computers, workstations, and the like.

The wireless communication device 104 of FIG. 3 further includes an audio output controller 322 that receives decoded audio output signals from the receiver 308 or the local wireless link transmit/receive module 320. The audio controller 322 sends the received decoded audio signals to the audio output conditioning circuits 324 that perform various conditioning functions. For example, the audio output conditioning circuits 324 may reduce noise or amplify the signal. A speaker 326 receives the conditioned audio signals and allows audio output for listening by a user. The audio output controller 322, audio output conditioning circuits 324, and the speaker 326 also allow for an audible alert to be generated notifying the user of a missed call, received messages, or the like. The wireless communication device 104 further includes additional user output interfaces 328, for example, a head phone jack (not shown) or a hands-free speaker (not shown).

The wireless communication device 104 also includes a microphone 330 for allowing a user to input audio signals into the wireless communication device 104. Sound waves are received by the microphone 330 and are converted into an electrical audio signal. Audio input conditioning circuits 332 receive the audio signal and perform various conditioning functions on the audio signal, for example, noise reduction. An audio input controller 334 receives the conditioned audio signal and sends a representation of the audio signal to the device controller 302.

The wireless communication device 104 also comprises a keyboard 336 for allowing a user to enter information into the wireless communication device 104. The wireless communication device 104 further comprises a camera 338 for allowing a user to capture still images or video images into memory 314. Furthermore, the wireless communication device 104 includes additional user input interfaces 340, for example, touch screen technology (not shown), a joystick (not shown), or a scroll wheel (not shown). In one embodiment, a peripheral interface (not shown) is also included for allowing the connection of a data cable to the wireless communication device 104. In one embodiment of the present invention, the connection of a data cable allows the wireless communication device 104 to be connected to a computer or a printer.

A visual notification (or indication) interface 342 is also included on the wireless communication device 104 for rendering a visual notification (or visual indication), for example, a sequence of colored lights on the display 346 or flashing one ore more LEDs (not shown), to the user of the wireless communication device 104. For example, a received multimedia message may include a sequence of colored lights to be displayed to the user as part of the message. Alternatively, the visual notification interface 342 may be used as an alert by displaying a sequence of colored lights or a single flashing light on the display 346 or LEDs (not shown) when the wireless communication device 104 receives a message, or the user missed a call.

The wireless communication device 104 also includes a tactile interface 344 for delivering a vibrating media component, tactile alert, or the like. For example, a multimedia message received by the wireless communication device 104, may include a video media component that provides a vibration during playback of the multimedia message. The tactile interface 344, in one embodiment, is used during a silent mode of the wireless communication device 104 to alert the user of an incoming call or message, missed call, or the like. The tactile interface 344 allows this vibration to occur, for example, through a vibrating motor or the like.

The wireless communication device 104 also includes a display 346 for displaying information to the user of the wireless communication device 104 and an optional Global Positioning System (GPS) module 348 The optional GPS module 348 determines the location and/or velocity information of the wireless communication device 104. This module 348 uses the GPS satellite system to determine the location and/or velocity of the wireless communication device 104. Alternative to the GPS module 348, the wireless communication device 104 may include alternative modules for determining the location and/or velocity of wireless communication device 104, for example, using cell tower triangulation and assisted GPS.

Example of Interference Between Two Wireless Communication Devices

Figure 4:
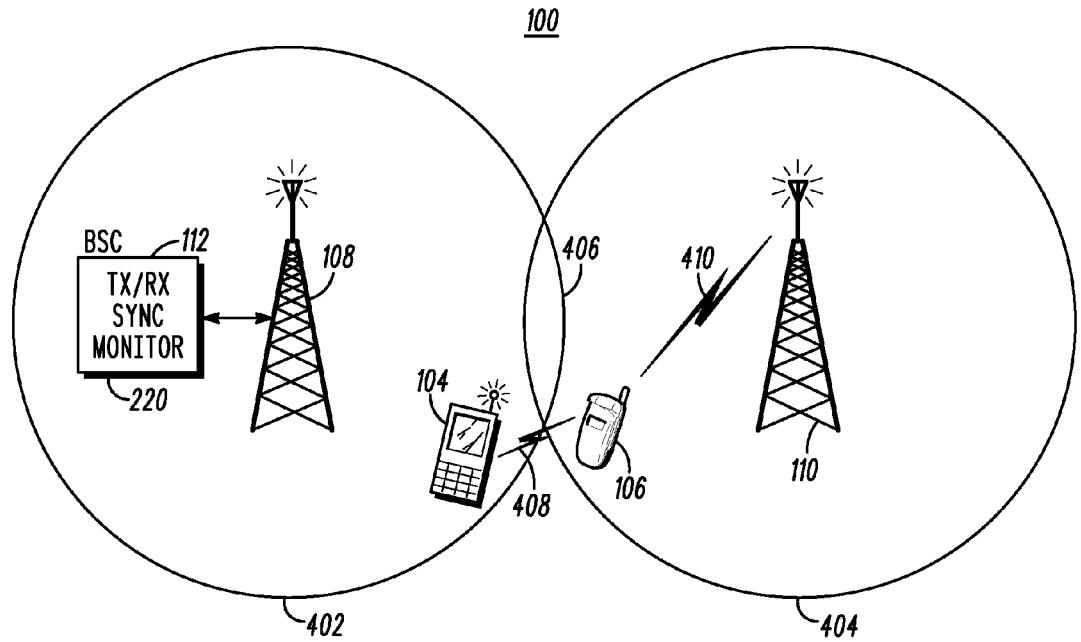
FIG. 4 is graphical representation of the system of FIG. 1 illustrating a condition where interference is occurring between two wireless communication devices.
Figure 5:
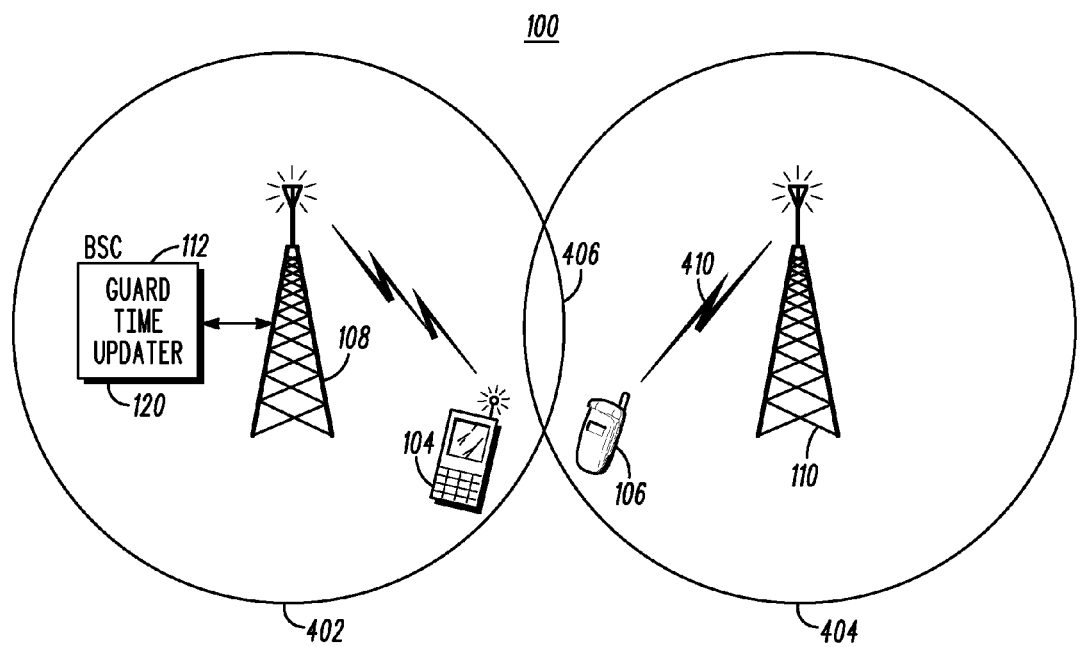
FIG. 5 is a graphical representation of the system of FIG. 1 illustrating a condition after guard times have been adjusted to mitigate the interference shown in FIG. 4, according to an embodiment of the present invention.

FIG. 4 is an illustration of the wireless communication system 100 where interference occurs between two wireless communication devices 104, 106. FIG. 5 is an illustration of the wireless communication system 100 after guard times have been adjusted to mitigate this interference. The wireless communication devices 104, 106 are located in adjacent cells 402, 404 and are in relative close proximity to each other. FIG. 4 shows one of the wireless communication devices 104 as being unsynchronized with the remaining devices 106 in the TDD system. As discussed above, if a timing reference is lost at the base station 108, the base station 108 itself and its respective wireless devices 104 lose synchronization from the rest of the TDD system 100.

In the example of FIG. 4, the unsynchronized wireless communication device 104 is listening (receiving) for a transmission from its base station 110. The synchronized devices such as the wireless communication device 106 are transmitting to their base stations 110. For example, the wireless communication device 106, which is relatively close to the unsynchronized wireless device 104, is transmitting a signal 406 to its base station 108. Therefore, the unsynchronized wireless device 104 receives a signal 408 from the wireless device 106 causing interference. It should be noted that both devices 104, 106 in FIG. 4 could be unsynchronized or that the unsynchronized device 104 could be transmitting when the other devices 106 are receiving.

As discussed above, each base station 108, 110 includes a TX/RX synchronization monitor 220 that detects if a timing reference is lost. Once this loss is detected, the guard time updater 120 adjusts the guard time for a TDD frame, as discussed above. FIG. 5 shows the system 100 after guard times have been adjusted. For example, the wireless device 104 now transmits a signal 502 to its base station 108 while the other devices 106 are transmitting. In other words, the devices are transmitting and receiving during the same periods of time. Therefore, the devices do not interfere with one another.

TDD Frame

Figure 6:
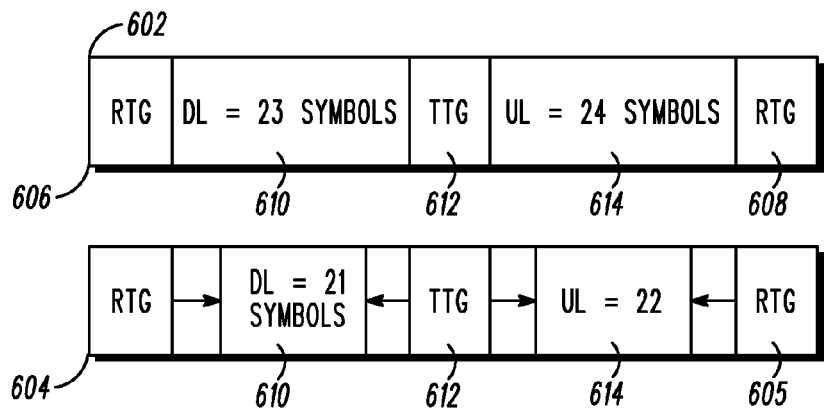
FIG. 6 is a datagram illustrating a frame structure for time division duplex communications where guard times have been adjusted to mitigate transmission/receiving synchronization loss, according to an embodiment of the present invention.

FIG. 6 shows an initial TDD frame 602 and an adjusted TDD frame 604 for an 802.16e system. The initial frame 602 comprises a plurality of subframes such an RTG 606, 608 downlink subframe 610, a TTG 612, and an uplink subframe 614. Other components of the frame such as a preamble are not shown. As discussed above, the RTG 606, 608 is a receive turn time (e.g. 50 µs), which is a period of time where a device such as a wireless communication device transitions from a receiving mode to a transmit mode. The TTG 612 is a transmit turn time (e.g. 115.7 µs), which is a period of time where a device such as a wireless communication device transitions from a receiving mode to a transmit mode.

The downlink subframe 610 has two dimensions, which are time (symbols, e.g. 23 symbols) and frequencies (tones). It should be noted that the present invention is not limited to these symbols or a fixed symbol time. A particular wireless communication device may be assigned to a symbol and/or tones within the time-frequency space of the downlink subframe 610. For example, the base station 108, 110 transmits a downlink map to each of its wireless communication devices. The wireless devices use the downlink map to identify which symbol(s) it has been assigned for transmitting data. In other embodiments, the downlink map is used to identify the symbols and tones that the device has been assigned to. The base station 108, 110 also transmits an uplink map via a down link to the wireless communication devices. The reverse link, in one embodiment, has 35 sub-channels, which are groups of tones. The uplink map identifies which sub-channel and slots a particular device is assigned and the modulation and coding scheme to be used for that sub-channel. A slot, in one embodiment, is N tones by M symbols and multiple slots can be allocated to a single burst.

As discussed above, in the TDD system according to the present example the downlink subframe 610 and the uplink subframe 614 need to stay aligned between base stations 108, 110 to manage interference. If a timing reference is lost so that one or more of the base stations (and their wireless devices) are no longer synchronized, the guard time updater 120 adjusts the guard times accordingly. The stability oscillator 210, which extends the free run time of the base station 108, 110 after a timing reference loss, has a known maximum slip rate. This maximum slip rate is used to determine the smallest amount of time it would take for the base station 108, 110 to slip a defined amount of frame structure (i.e. a symbol or slot in 802.16e).

For example, assume a medium stability oscillator slip rate of 0.8 µs/hour (assuming 40° C. temperature change), an RTG 606, 608 of 50 µs, a TTG 612 of 115.7 µs, a downlink subframe 610 of 23 symbols at 102.857 µs per symbol, an uplink subframe 614 of 24 symbols at 102.857 µs per symbol, and a per symbol cyclic prefix of 11.429 µs. The maximum slip that can be allowed before interference problems arise is (11.429 µs/2 µs)/(0.8 µs/hr)=14.2 hours (full CP). It should be noted that this equation assumes that a slip of a cyclic prefix duration is allowed. It should also be noted that this is only one example, other symbol times and/or durations can be used.

Therefore, the guard time adjuster 120 advances/retards the last/first subframe symbol in 14.2 hours. For example, the adjusted frame 604 shows the last/first symbol in each of the subframes 610, 612 being advanced/retarded resulting in the downlink subframe 610 going from 23 symbols to 21 symbols and the uplink subframe going from 24 symbols to 21 symbols. This reduces the available transmission and/or reception time in the corresponding subframe so that frame misalignment with other synchronized base stations is eliminated. Therefore, interference does not occur between wireless communication devices 104, 106.

Process Of Adjusting Guard Times

Figure 7:
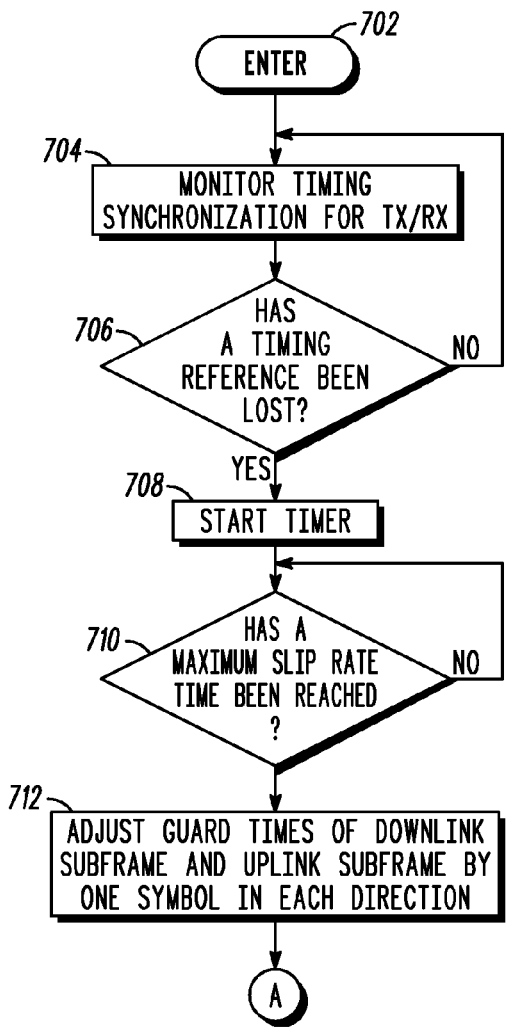
FIG. 7 is an operational flow diagram illustrating a process of adjusting guard times of a TDD communication frame to mitigate communication interference, according to an embodiment of the present invention.
Figure 8:
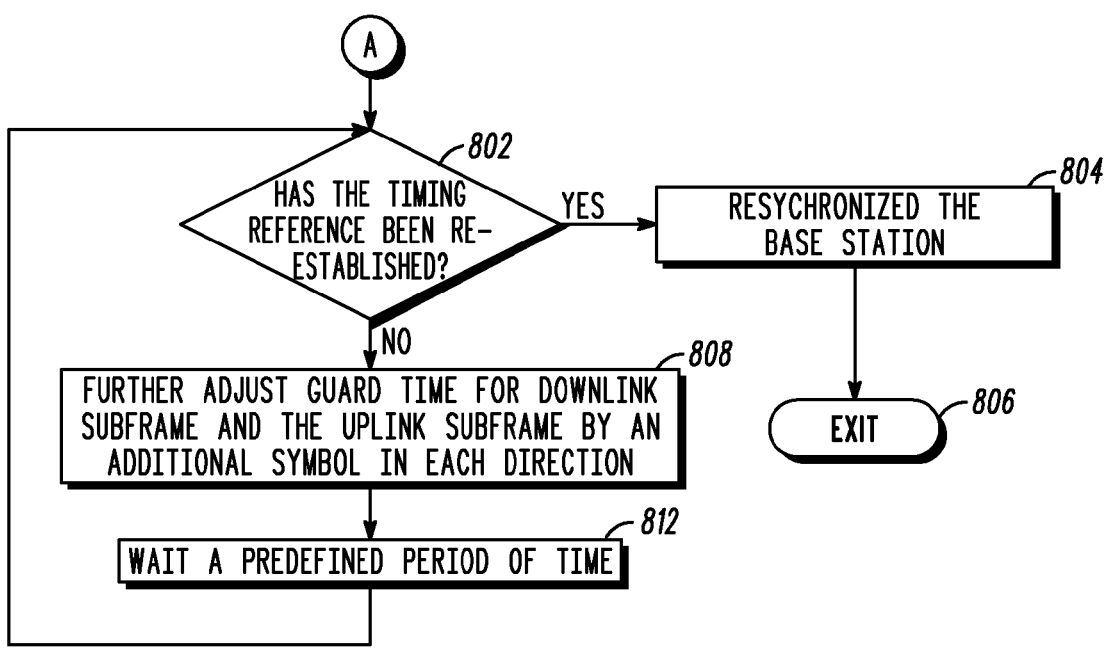
FIG. 8 is an operational flow diagram illustrating another process of adjusting guard times of a TDD communication frame to mitigate communication interference, according to an embodiment of the present invention.

FIG. 7 and FIG. 8 are operational flow diagrams illustrating processes of adjusting guard times in a TDD frame for mitigating communication interference between two wireless communication devices. The operational flow diagram of FIG. 7 begins at step 702 and flows directly to step 704. The TX/RX synchronization monitor 220 of the site controller 112, 114, at step 704, monitors the base stations 108, 110 synchronization with the rest of the TDD system. The monitor 220, at step 706, determines if a timing reference has been lost. If the result of this determination is negative, the monitor continues to monitor the synchronization of the base station. If the result of this determination is positive, a TX/RX synchronization timer, at step 708, is started. The site controller 112, 114 determines, at step 710, if a maximum slip rate time has passed. For example, once a timing reference is lost, a stability oscillator 210 allows the base station 108, 110 and its wireless devices 104, 106 to continue transmitting and receiving without causing interference. However, the stability oscillator 210 has a known drift rate. So the site controller 112, 114 uses this known drift to determine if a maximum allowable drift time has passed before interference occurs between devices in the TDD system.

If the result of this determination is negative, the site controller 112, 114 continues to monitor if the maximum drift has passed. If the result of this determination is positive, the guard time updater 120, at step 712, adjusts the guard times of the downlink and uplink subframes in each TDD frame by one symbol time in each direction. This reduces the amount of transmission/reception time for each wireless device 104, 108 and base station 108, 110 that is unsynchronized while increasing the RTG and TTG times, thereby ensuring that a wireless device 104, 106 does not transmit/receive while another wireless device 104, 106 is receiving/transmitting and vice versa. The control flow, in one embodiment, then flows to entry point A of FIG. 8.

FIG. 8 shows another process of adjusting the guard times of a TDD frame. The control flow enters at entry point A. The site controller 112, 114, at step 802, determines if the timing reference of the unsynchronized base station 108, 100 has been re-established. If the result of this determination is positive, the TX/RX synchronizer 224, at step 804, synchronizes the base station 108, 110. The control flow then exits at step 806. If the result of this determination is negative, the guard time updater 120, at step 808, further adjusts the guard times of the downlink and uplink subframes by an additional symbol in each direction. For example, if after a predefined period of time from initially adjusting the guard times the site controller 112, 114 determines that the base station 108, 110 is still unsynchronized, the guard times are further adjusted to mitigate interference. The site controller 112, 114, at step 812, waits a predefined period of time and then continues to determine if the timing reference has been re-established.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, in a wireless communications system, for mitigating at least one of a transmission timing synchronization loss and a receiving timing synchronization loss at a base station, the method comprising:

determining, at a first base station, a loss of a timing reference, wherein the timing reference is used by the first base station for timing synchronization of at least one of a transmission and reception of wireless data, and wherein the timing synchronization is predefined and common between at least the first base station and a second base station; and adjusting, in response to the determining, a duration of at least one of a transmit guard time and a receive guard time by at least one symbol time, wherein each of the transmit guard time and the receive guard time is a time period between symbols, during which symbols the first base station exchanges data with a wireless communication device, and wherein the transmit guard time and the receive guard time are time periods when neither the first base station nor the wireless communication device are transmitting.

2. The method of claim 1, wherein the determining further comprises:

starting a time period count associated with the loss of the timing reference.

3. The method of claim 1, wherein the adjusting comprises determining that a first predefined period of time has elapsed since a point in time while determining the loss of the timing reference.

4. The method of claim 1, further comprising:

determining that a second predefined time period has passed since the loss of the timing reference; and in response to the second predefined time period having elapsed, adjusting a duration of at least one of the transmit guard time and the receive guard time by at least one additional symbol time.

5. The method of claim 1, further comprising:

determining subsequent to the adjusting, that the timing reference has been restored; and adjusting, in response to determining that the timing reference has been restored, a duration of at least one of the transmit guard time and the receive guard time.

6. The method of claim 1, wherein the determining loss of the timing reference comprises determining any of:

a loss of a GPS timing reference;

loss of reception of a communication timing synchronization message; and a combination thereof.

7. A wireless communication system for mitigating at least one of a transmission timing synchronization loss and a receiving timing synchronization loss at a base station, the wireless communication system comprising:

a plurality of wireless devices;

a plurality of base stations communicatively coupled to the plurality of wireless devices; and at least one information processing system communicatively coupled to the plurality of base stations, wherein the information processing system comprises:
a synchronization monitor for determining a loss of a timing reference at least a first base station, wherein the timing reference is used by the first base station for timing synchronization of at least one of a transmission and reception of wireless data, and wherein the timing synchronization is predefined and common between at least the first base station and a second base station; and
a guard time updater for adjusting, in response to the determining, a duration of at least one of a transmit guard time and a receive guard time associated with the at least first base station by at least one symbol time, wherein each of the transmit guard time and the receive guard time is a time period between symbols, during which symbols the first base station exchanges data with a wireless communication device, and wherein the transmit guard time and the receive guard time are time periods when neither the first base station nor the wireless communication device are transmitting.

8. The wireless communication system of claim 7, wherein the information processing system further comprises:
a synchronization loss timer for starting a time period count associated with the loss of the timing reference in response to the determining the loss of the timing reference.

9. The wireless communication system of claim 7, wherein the guard time updater further:
determines that a first predefined period of time has elapsed since a point in time while determining the loss of the timing reference.

10. The wireless communication system of claim 7, wherein the guard time updater further:
determines that a second predefined time period has passed since the loss of the timing reference; and
in response to the second predefined time period having elapsed, adjusts a duration of at least one of the transmit guard time and the receive guard time by at least one additional symbol time.

11. The wireless communication system of claim 7, wherein the synchronization monitor further:
determines subsequent to the adjusting, that the timing reference has been restored; and
adjusts, in response to determining that the timing reference has been restored, a duration of at least one of the transmit guard time and the receive guard time.

12. A site controller communicatively coupled to at least one base station for mitigating at least one of a transmission timing synchronization loss and a receiving timing synchronization loss the at least one base station, the site controller comprising:
a synchronization monitor for determining a loss of a timing reference at least a first base station, wherein the timing reference is used by the first base station for timing synchronization of at least one of a transmission and reception of wireless data, and wherein the timing synchronization is predefined and common between at least the first base station and a second base station; and
a guard time updater for adjusting, in response to the determining, a duration of at least one of a transmit guard time and a receive guard time associated with the at least first base station by at least one symbol time, wherein each of the transmit guard time and the receive guard time is a time period between symbols, during which symbols the first base station exchanges data with a wireless communication device, and wherein the transmit guard time and the receive guard time are time periods when neither the first base station nor the wireless communication device are transmitting.

13. The site controller of claim 12, wherein the site controller further comprises:
a synchronization loss timer for starting a time period count associated with the loss of the timing reference in response to the determining the loss of the timing reference.

14. The site controller of claim 12, wherein the guard time updater further:
determines that a first predefined period of time has elapsed since a point in time while determining the loss of the timing reference.

15. The site controller of claim 12, wherein the guard time updater further:
determines that a second predefined time period has passed since the loss of the timing reference; and
in response to the second predefined time period having elapsed, adjusts a duration of at least one of the transmit guard time and the receive guard time by at least one additional symbol time.

16. The site controller of claim 12, wherein the synchronization monitor further:
determines subsequent to the adjusting, that the timing reference has been restored; and
adjusts, in response to determining that the timing reference has been restored, a duration of at least one of the transmit guard time and the receive guard time.

17. The site controller of claim 12, wherein the synchronization monitor determines loss of the timing reference by determining any of:
a loss of a GPS timing reference;
loss of reception of a communication timing synchronization message; and
a combination thereof.

18. The method of claim 1, wherein adjusting a duration of at least one of a transmit guard time and a receive guard time comprises one or more of:
increasing a duration of a transmit guard time and correspondingly reducing an amount of a transmission time by idling a transmission symbol; and
increasing a time of a duration of a receive guard time and correspondingly reducing an amount of a corresponding reception time by idling a transmission symbol.

19. The wireless communication system of claim 7, wherein the guard time updater adjusts a duration of at least one of a transmit guard time and a receive guard time by one or more of:
increasing a duration of a transmit guard time and correspondingly reducing an amount of a transmission time by idling a transmission symbol; and
increasing a time of a duration of a receive guard time and correspondingly reducing an amount of a corresponding reception time by idling a transmission symbol.

20. The site controller of claim 12, wherein the guard time updater adjusts a duration of at least one of a transmit guard time and a receive guard time by one or more of:
increasing a duration of a transmit guard time and correspondingly reducing an amount of a transmission time by idling a transmission symbol; and
increasing a time of a duration of a receive guard time and correspondingly reducing an amount of a corresponding reception time by idling a transmission symbol.

* * * * *